United States Patent
Lee

(10) Patent No.: US 8,826,343 B2
(45) Date of Patent: *Sep. 2, 2014

(54) METHOD OF PROVIDING KEY FRAMES OF VIDEO IN MOBILE TERMINAL

(75) Inventor: Taeyeon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 13/594,034

(22) Filed: Aug. 24, 2012

(65) Prior Publication Data
US 2012/0321277 A1    Dec. 20, 2012

Related U.S. Application Data

(63) Continuation of application No. 11/949,503, filed on Dec. 3, 2007, now Pat. No. 8,307,399.

(30) Foreign Application Priority Data

Dec. 20, 2006   (KR) ................. 10-2006-0131093

(51) Int. Cl.
| | |
|---|---|
| H04N 7/16 | (2011.01) |
| H04N 7/18 | (2006.01) |
| H04N 7/173 | (2011.01) |
| G06F 3/00 | (2006.01) |
| H04N 21/414 | (2011.01) |
| H04N 21/482 | (2011.01) |
| H04N 21/472 | (2011.01) |
| H04N 21/845 | (2011.01) |
| H04N 21/8549 | (2011.01) |

(52) U.S. Cl.
CPC ..... *H04N 7/17318* (2013.01); *H04N 21/41407* (2013.01); *H04N 21/482* (2013.01); *H04N 21/47202* (2013.01); *H04N 21/8453* (2013.01); *H04N 21/8549* (2013.01)
USPC .................. 725/62; 725/85; 725/86; 725/87; 725/90; 715/720; 715/721; 715/723

(58) Field of Classification Search
USPC ................... 725/62, 85–87, 90; 715/720–723
See application file for complete search history.

(56) References Cited

U.S. PATENT DOCUMENTS

| | | | |
|---|---|---|---|
| 6,222,532 B1 | 4/2001 | Ceccarelli | |
| 2002/0186234 A1* | 12/2002 | Van De Streek et al. | 345/719 |

(Continued)

FOREIGN PATENT DOCUMENTS

| | | |
|---|---|---|
| JP | 2005-210234 A | 8/2005 |
| JP | 2005-285076 A | 10/2005 |

(Continued)

OTHER PUBLICATIONS

Authors: Uchihashi, Foote, Girgensohn and Boreczky; Title: "Video Manga: Generating Semantical Meaningful Video Summaries"; Date: Oct. 1999 Orlando FL.*

*Primary Examiner* — Nathan J. Flynn
*Assistant Examiner* — Gigi L Dubasky
(74) *Attorney, Agent, or Firm* — Birch, Stewart, Kolasch & Birch, LLP

(57) ABSTRACT

A display configured to display a list of videos that can be reproduced on the terminal on a screen of the terminal, an input unit configured to select a specific video from the list of videos, and a controller configured to select a plurality of key frames from image frames of the specific video based on a predetermined selection criterion. Further, the display displays the plurality of key frames of the specific video.

28 Claims, 8 Drawing Sheets

(56) References Cited

U.S. PATENT DOCUMENTS

| | | |
|---|---|---|
| 2003/0002852 A1 | 1/2003 | Kobayashi |
| 2003/0023758 A1 | 1/2003 | Yoshikawa et al. |
| 2003/0122861 A1 | 7/2003 | Jun et al. |
| 2003/0189588 A1 | 10/2003 | Girgensohn et al. |
| 2004/0221322 A1 | 11/2004 | Shen et al. |
| 2005/0033758 A1 | 2/2005 | Baxter |
| 2005/0183016 A1 | 8/2005 | Horiuchi et al. |
| 2005/0226331 A1* | 10/2005 | Mohamed et al. ....... 375/240.16 |
| 2006/0256131 A1* | 11/2006 | Trepess ........................ 345/619 |
| 2007/0266322 A1 | 11/2007 | Tretter et al. |

FOREIGN PATENT DOCUMENTS

| | | |
|---|---|---|
| KR | 10-2006-0022364 A | 3/2006 |
| KR | 10-2006-0110076 A | 10/2006 |

* cited by examiner

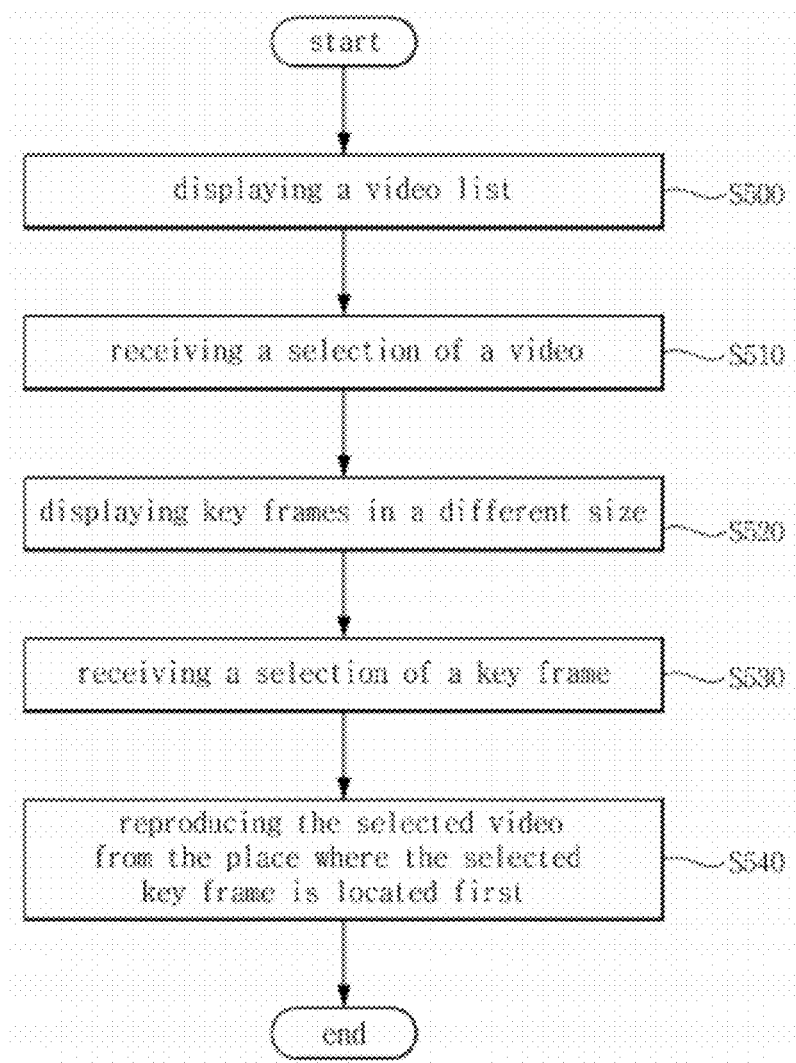

METHOD OF PROVIDING KEY FRAMES OF VIDEO IN MOBILE TERMINAL

CROSS REFERENCE TO RELATED APPLICATION

The present application is a 37 C.F.R. §1.53(b) Continuation of U.S. patent application Ser. No. 11/949,503 filed Dec. 3, 2007 now U.S. Pat. No. 8,307,399, which claims priority on Korean Patent Application No. 10-2006-0131093, filed on Dec. 20, 2006. The entire contents of all of the above applications are hereby incorporated by reference.

BACKGROUND OF THE INVENTION

1. Field of the Invention

The present invention relates to a mobile terminal and corresponding method of providing key frames of a video selected from a plurality of videos and that are displayed on the mobile terminal so as to identify an overall story of the video and allow a user to start watching the video at a selected key frame.

2. Description of the Related Art

Mobile terminals now provide many additional functions besides the basic call service function. For example, users can now send and receive text and voice messages, watch videos, sporting events and other broadcast programs, perform scheduling tasks, access the Internet, etc.

For example, mobile terminals now allow the user to connect not only to a mobile communication network, but also various communication/broadcast networks including a portable Internet network, an integrated wire/wireless internet network, a mobile broadcasting network, etc, so that a user can download and reproduce various audio/video multimedia contents using their mobile terminal.

However, it is difficult for users to get an overall feeling of whether or not they want to download or watch a particular video, because generally only the name of the video is given to the user. In addition, because the display size of the mobile terminal is limited, the titles of the available downloads are sometimes abbreviated, making it more difficult to get an overall feeling for what the movie or download is about.

SUMMARY OF THE INVENTION

Accordingly, one object of the present invention is to address the above-noted and other problems.

Another object of the present invention is to provide a mobile terminal and corresponding method of advantageously displaying key frames of a selected video so that a user can easily identify the overall story of the video.

To achieve these and other advantages and in accordance with the purpose of the present invention, as embodied and broadly described herein, the present invention provides in one aspect a method of displaying videos on a mobile communication terminal, which includes displaying a list of videos that can be reproduced on the terminal on a screen of the terminal, selecting a specific video from the list of videos, and displaying a plurality of key frames of the specific video. Further, the plurality of key frames are selected from image frames of the specific video based on a predetermined selection criterion.

In another aspect, the present invention provides a mobile communication terminal including a display configured to display a list of videos that can be reproduced on the terminal on a screen of the terminal, an input unit configured to select a specific video from the list of videos, and a controller configured to select a plurality of key frames from image frames of the specific video based on a predetermined selection criterion. Further, the display displays the plurality of key frames of the specific video.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is a flowchart illustrating a method of displaying key frames of video on a mobile terminal according to a second embodiment of the present invention;

DETAILED DESCRIPTION OF THE INVENTION

Preferred embodiments of the present invention will be described in a more detailed manner with reference to the drawings.

One method of displaying frames of a video is to display only a first or a last frame of the video. However, this method is insufficient in providing a user will an overall appreciation of the plot for the video. Rather, the user generally only sees the title or actors playing in the video.

Further, two different videos cannot be identified from each other when their first frames are monochromatic. Also, the first or last frames do not have a particular degree of importance in the overall plot of the video. That is, the user cannot identify the overall story of the video based on the first or last frames of the video.

Accordingly, an improved method is to display a plurality of key frames of the movie or download that have a particular degree of importance so that the user can quickly see and comprehend what the overall story or plot of the movie or download is. These features will be described in more detail with respect to the following figures.

Figure 1:
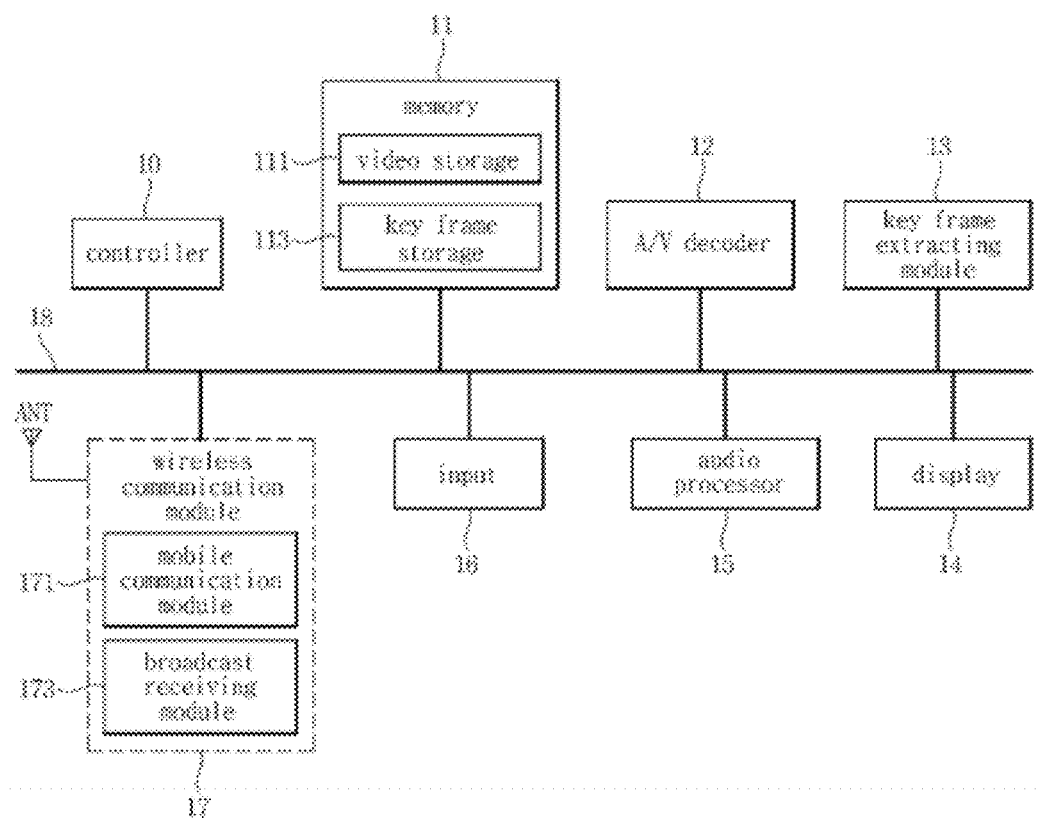
FIG. 1 is a block diagram illustrating a mobile terminal according to an embodiment of the present invention.
Figure 2:
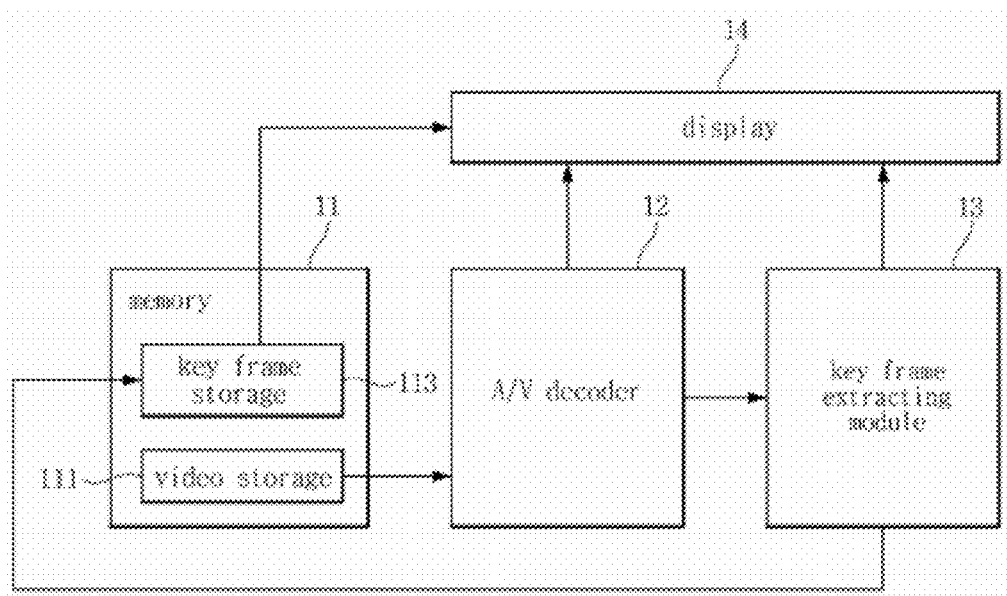
FIG. 2 is a block diagram illustrating in more detail a relationship between some of the elements in the mobile terminal shown in FIG. 1 according to an embodiment of the present invention.

FIG. 1 is a block diagram of a mobile terminal 100 according to an embodiment of the present invention, and FIG. 2 is a block diagram illustrating in more detail a relationship between some of the elements in the mobile terminal shown in FIG. 1 according to an embodiment of the present invention.

As shown in FIG. 1, the mobile terminal includes a controller 10, a memory 11, an A/V (audio/video) decoder 12, a key frame extracting module 13, a display 14, an audio processor 15, an input 16 and a wireless communication module 17. As shown, these elements are connected to each other via a bus 18.

Further, the memory 11 stores one or more programs to control an overall operation of the mobile terminal 100 and stores other types of data that are input, output, or processed when the overall operation of the mobile terminal 100 is performed. As shown in FIGS. 1 and 2, the memory 11 includes a video storage area 111 and a key frame storage area 113. The video storage area 111 stores various videos that the user has previously downloaded or videos that the user views in real time and also stores the downloaded video.

The key frame storage area 113 stores key frames, which are extracted by the key frame extracting module 13 with respect to a particular video. Further, the A/V decoder 12 decodes a video and/or audio data, which is transmitted from the video storage area 111, and outputs the decoded audio/video through the display 14 and/or the audio processor 15. The A/V decoder 12 also transmits the decoded video to the key frame extracting module 13.

The key frame extracting module 13 then extracts key frames among image frames included in the video based on a predetermined selection criterion that will be described later. The extracted key frames are then displayed on the display 14 or are stored in the key frame storage area 113. Further, the display 14 displays operational states or other various information about the mobile terminal in response to a control signal output from the controller 10.

In addition, with reference to FIG. 1, the audio processor 15 processes an audio signal, and inputs and outputs the processed audio through a microphone (MIC) and a speaker (SPK), respectively. Also, the audio processor 15 outputs audio signals, which notify various processing and controlling operational states of the mobile terminal 100 through the speaker (SPK) and inputs audio signals indicating various information or commands through the microphone (MIC).

Further, the input 16 receives various information and commands from a user to control an operation of the terminal 100 and may be a key pad or a touch screen including various number keys, direction keys, etc. Also, the controller 10 controls the different elements of the terminal and controls an overall operation of the mobile terminal 100 including the features of the present invention.

Further, the wireless communication module 17 is used to wireless communicate with other terminals as well as to download and receive videos or other broadcasts. As shown in FIG. 1, the communication module 17 includes a mobile communication module 171 to transmit/receive data to/from a mobile communicating network, and a broadcast receiving module 173 to receive a broadcasting signal from a broadcasting network. In addition, the mobile terminal can receive a video through the mobile communication module 171 or the broadcast receiving module 173.

Figure 3:
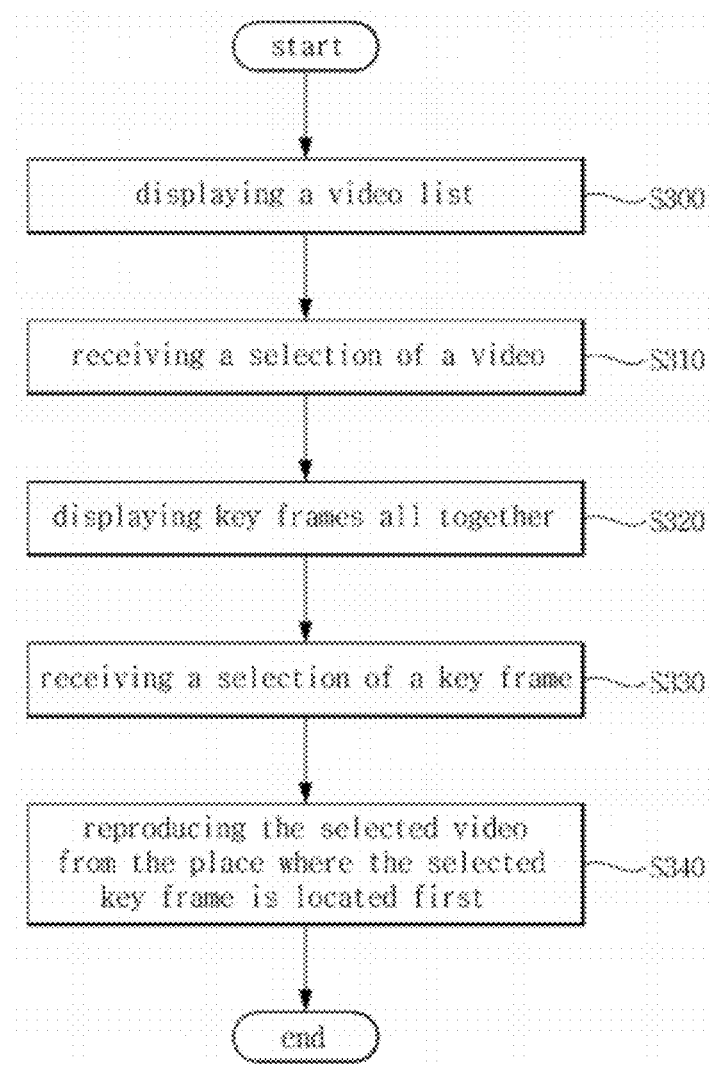
FIG. 3 is a flowchart illustrating a method of displaying key frames of a video on a mobile terminal according to a first embodiment of the present invention.

Next, FIG. 3 is a flowchart illustrating a method of providing key frames of a video in a mobile terminal according to the first embodiment of the present invention. FIG. 1 will also be referred to in this description.

As shown in FIG. 3, the controller 10 controls the display 14 to display a list of videos (S300). The list of videos may be one or more videos that are stored in the video storage area 111 of the memory 11. The list of videos may also be one or more videos that are stored on an external storage medium such as a website that provides videos or broadcasts that the user can view in real time without storing the videos on their own terminal or that the user can view in real time and simultaneously store on their own terminal.

Further, the list of videos may be a list of titles of the videos or a list of key frames where each key frame indicates an individual video. For example, FIG. 4(a) illustrates the list of videos being displayed as characters 40 (or titles or numbers of the videos), and FIG. 4(b) illustrates the list of videos being displayed by key frames 41 of the videos.

Next, in step S310 of FIG. 3, a desired video is selected from the video list. For example, a user can select the desired video from the video list by using direction keys provided in the input 16 or when the display 14 is a touch screen, by touching the desired video from the list. In more detail, FIG. 4(a) illustrates the first video (video 1) being selected. Therefore, the user could press a down-direction key once to select the second video ("video 2"). Alternatively, when the display 14 is a touch screen, the user can simply touch the second video (or any other video he or she is interested in possibly viewing).

Then, with reference to FIG. 3, the controller 10 displays the key frames for a selected video on the display 14 (S320). Further, the key frames, which are selected from image frames included in the selected video, are displayed on the display 14 in a sequential order of time for reproduction. The user can then select one of the displayed key frames (S330), and the controller 10 begins playing the video at the selected frame (S340).

Figure 4A:
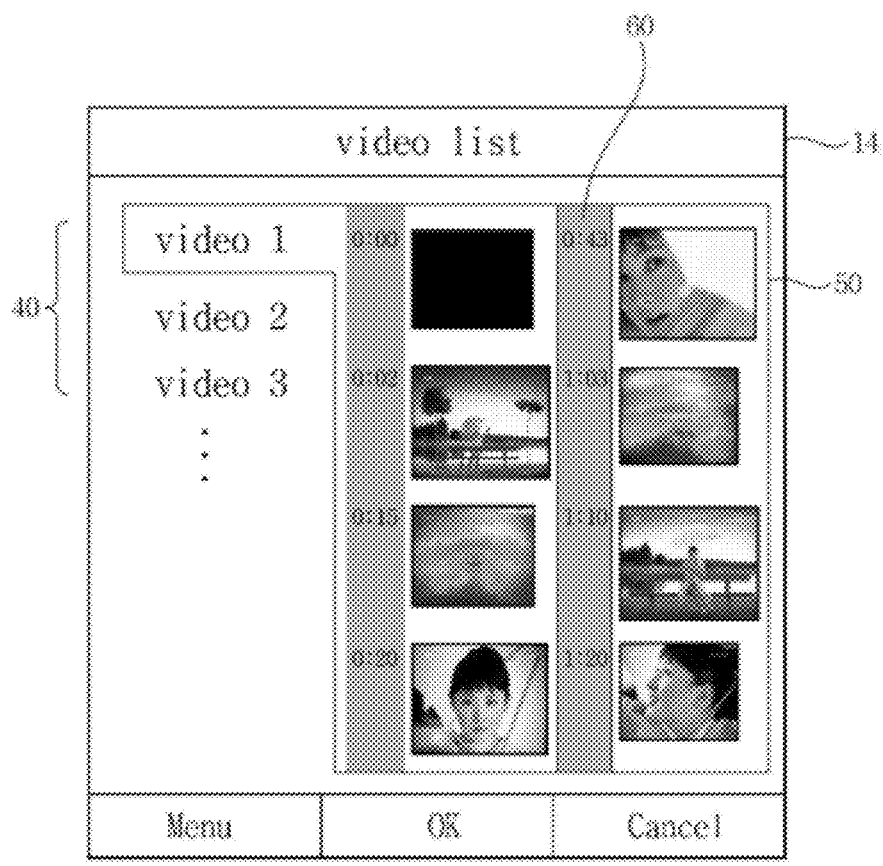
FIG. 4(a) is an overview illustrating a list of videos and particular key frames for a selected video being displayed on the mobile terminal according to an embodiment of the present invention.
Figure 4B:
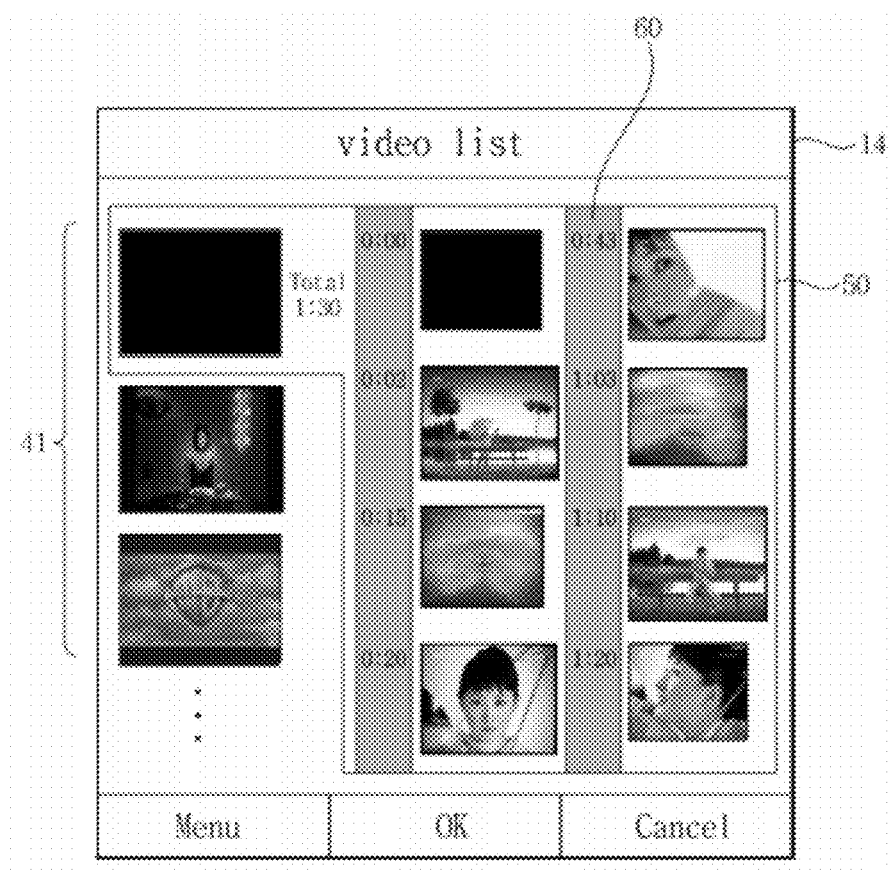
FIG. 4(b) is an overview illustrating a list of videos and particular key frames for a selected video being displayed on the mobile terminal according to another embodiment of the present invention.

The above features are shown in more detail in FIGS. 4(a) and 4(b). For example, FIG. 4(a) illustrates the extracted key frames 50 for the video 1 being displayed in a sequential time series order as indicated by a time increment (reproducing time) 60 for each particular key frame. FIG. 4(b) is similar to FIG. 4(a), but illustrates the list of videos being displayed as key frames 41.

Further, the total number of displayed key frames can be adjusted based on a size of the display 14 in step S320. For example, if the number of the key frames selected based on the predetermined selection criterion is ten, and the number of frames that can be displayed on the display 14 is eight frames, then eight frames out of the ten total frames that best match the selection criterion are displayed on the display 14. The user can also set the number of frames to be displayed using the appropriate menu options on the mobile terminal.

In addition, the individual size of the displayed key frames can also be adjusted based on the size of the display 14 in the operation 5320. For example, if the number of the selected key frames by the predetermined selection criterion is ten and the number of frames that can be displayed on the display 14 is eight, the individual size of the selected key frames is adjusted so that all ten key frames can be displayed on the display 14.

Further, the individual size of the key frames may be set to be different from each other depending on the degree of importance of the individual key frames (note FIGS. 4(a) and 4(b) illustrate this feature). For example, key frames that are matched better to the selection criterion are displayed in a larger size while key frames that are matched worse to the selection criterion are displayed in a smaller size.

Thus, by displaying key frames in different sizes as described above, the user can easily identify the degree of importance of the displayed key frames. In addition, as discussed above with respect to FIG. 3, when the user selects a particular key frame among the displayed key frames (S330), the controller 10 reproduces the video from the location indicated by the selected key frame (S340).

In more detail, the user can press a direction key on terminal to toggle between the different videos shown in FIGS. 4(a) and 4(b). Then, the controller 10 displays the key frames corresponding to each selected video (FIGS. 4(a) and 4(b) illustrate the key frames being displayed for the "video 1"). The user can then press the "OK" button in the state that the "video 1" is selected, and the controller 10 changes the mode of the displayed frames such that the user can select one of the key frames. The selected video is then reproduced starting from the selected key frame.

Further, when the display includes a touch screen the user can simply touch the different videos to toggle between viewing the different key frames. The user can also just touch the OK button and then touch a particular key frame to start watching the video at the touched particular key frame.

Figure 6:
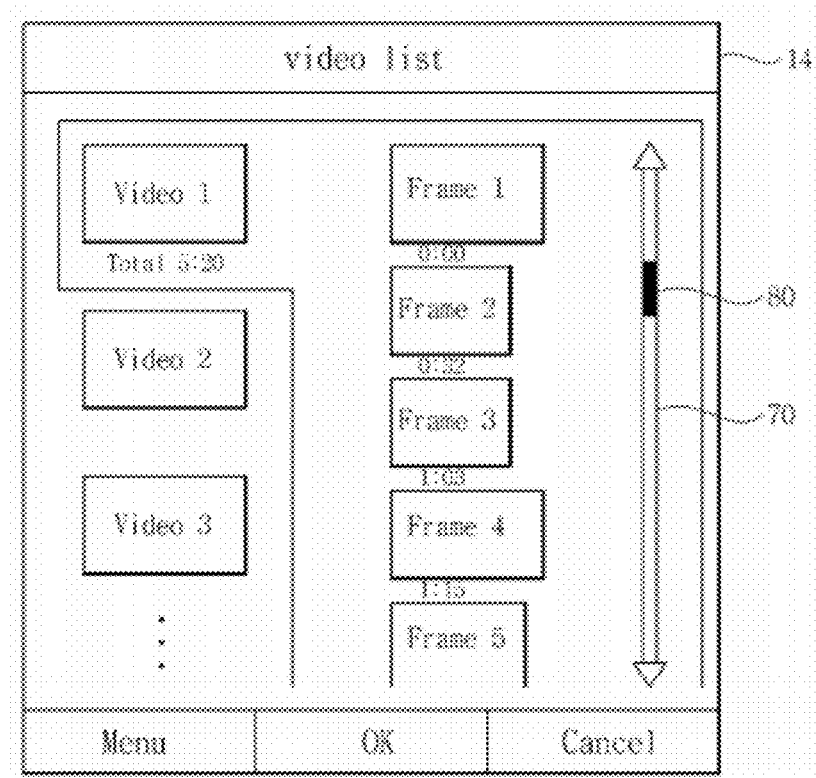
FIG. 6 is an overview illustrating a list of videos and particular key frames for a selected video being displayed on the mobile terminal according to still another embodiment of the present invention.

Next, FIG. 5 is a flowchart illustrating a method of displaying key frames of a video in a mobile terminal according to a second embodiment of the present invention, and FIG. 6 is an overview illustrating a list of videos and particular key frames for a selected video being displayed on the mobile terminal according to still another embodiment of the present invention. FIGS. 5 and 6 as well as FIGS. 1 and 2 will be referred to in describing the features of the second embodiment.

As shown, the controller 10 displays a list of videos that the user may select to view (S500), and then receive the user's selection of a particular video (S510). These steps are similar to the steps S300 and S310. Further, when the user selects a particular video or toggles between the different videos, the controller 10 displays the key frames for the selected video (S520).

In this step, the controller 10 displays the key frames to have different sizes, in which larger sized key frames match better to the selection criterion than do the smaller sized key frames. It is also possible to display the key frames to have the same size. Further, the user can also advantageously turn on or off this feature (i.e., displaying the key frames to have different sizes based on the predetermined selection criterion) using the appropriate menu options on the mobile terminal according to the present invention.

As discussed above, FIGS. 4(a) and 4(b) illustrate displaying the key frames to have different sizes. FIG. 6 also shows the controller 10 displaying the key frames to have different sizes (see "frame 1" and "frame 2", for example). Further, in this embodiment, the number of key frames to be displayed is larger the space available on the display 14. Thus, the controller 10 displays a scroll bar 70 the user can move to scroll through the different key frames. Further, a scroll indicator 80 indicates a currently selected key frame. That is, in FIG. 6, the Frame 2 is currently highlighted as the scroll indicator 80 is next to the Frame 2. Thus, the user can easily see what frame is highlighted or selected.

The user can then select the key using the OK button or by touching the corresponding frame when the display is a touch screen. Further, similar to the first embodiment, the selected key frames are displayed in the order of a reproducing time. The video is then reproduced starting at the selected frame.

Hereinafter, the predetermined selection criterion in the above-mentioned embodiments will be described. In more detail, the selection criterion may be to select the first frame or the last frame of a particular scene in the video. For example, in a car crash scene, the first frame showing the initial car crash may be set as the key frame.

Alternatively, the selection criterion may be to select a key frame based on a variation amount of colors. For example, a frame whose variation amount of colors exceeds a predetermined amount than a previous frame may be selected as a key frame. Similarly, the selection criterion may be to select a key frame based on a variation amount of motion with respect to a previous frame.

In addition, the selection criterion may be to select a key frame by clustering the variation amount of colors and the variation amount of motion. Also, the selection criterion may be to select a key frame whose variation amount of motion exceeds a predetermined criterion of a previous frame.

Figure 7:
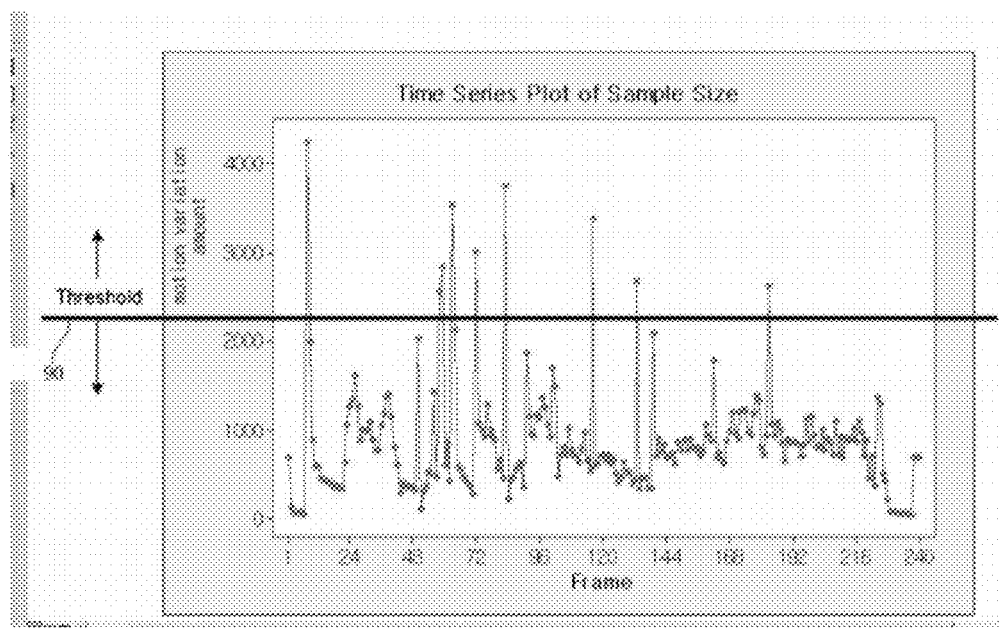
FIG. 7 is a graph illustrating an example of a distribution of motion variation amount in a sample-sized 3GP/MP4 moving picture.

In more detail, FIG. 7 is a graph illustrating an example of the distribution of motion variation amount in a sample-sized 3GP/MP4 moving picture. Thus, with reference to FIG. 7, any frames that exceed a predetermined criterion 90 are selected as key frames.

Further, as described in the first embodiment of the present invention, the number of key frames may be adjusted in consideration of the size of the display 14. For example, the reference 90 shown in FIG. 7 may be adjusted so that the number of key frames matches the number of frames that can be displayed on the display 14.

In more detail, if the number of frames that can be simultaneously displayed on the display 14 is eight and the number of the selected key frames in FIG. 7 is ten, the reference 90 can be raised so that the number of key frames is eight. In addition, if the number of frames that can be simultaneously displayed on the display 14 is eight and the number of the selected key frames in FIG. 7 is five, the reference 90 can be lowered so that the number of key frames is eight.

Further, it is also possible to display key frames from an external source. For example, the user can connect to the Internet or other wireless networks to view a particular video. In this instance, the user can view the key frames downloaded from the Internet before downloading the entire video so he or she can refer to the key frames to decide whether to download the entire video or to only download a portion of the video beginning at particular frame.

Further, the videos may be retrieved from a broadcasting network. That is, mobile terminals can now connect to different broadcast networks and view different broadcasting programs such as live sporting events, television programs, music concerts, etc. Thus, the user can first view key frames of a broadcasting program before deciding whether to download or receive the broadcast program.

As described, the method of displaying key frames of a video according to embodiments of the present invention have several advantages. For example, a user can identify the overall story of video at a glance based on the key frames and then decide if he or she wants to watch or download the video. In addition, the user can easily identify the overall story of the video, because the frames that are displayed are key frames produced on a predetermined selection criterion.

Also, in one embodiment, the user can view all key frames at a glance without having to scroll through the different key frames, because the number of key frames are dynamically adjusted to fit on the screen of the display. Further, the user can reproduce the video starting from the desired key frame, rather than viewing the entire video.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of displaying videos on a mobile communication terminal, the method comprising:
   displaying, via a display unit of the mobile communication terminal, a list of videos that can be reproduced in a first display area of the display unit;
   receiving a selection of a specific video from the list of videos, said specific video including all image frames of the specific video;
   simultaneously displaying with the list of videos a first subset of a plurality of image frames representing the specific video in a second display area of the display unit, the first subset of the plurality of image frames comprising the image frames among beginning and end portions of the specific video;
   displaying a moveable indicator within an area defined by the displayed first subset of the plurality of image frames, the moveable indicator indicating a currently selected specific image frame among the beginning and end portions of the specific video; and
   when a first particular image frame among the simultaneously displayed first subset of the plurality of image frames is selected, reproducing the specific video beginning at the selected first particular image frame,
   wherein the first and second display areas are predefined on the display unit,
   wherein the method further comprises determining a number of image frames for the first subset of the plurality of image frames based on a variation amount of motion of a current image frame with respect to a previous image frame, selecting the current image frame to be included in the first subset of the plurality of image frames when the variation amount of motion of the current image frame exceeds a predetermined threshold, and adjusting a size of each image frame in the first subset of the plurality of image frames based on how well the each image frame matches the predetermined threshold, and
   wherein the selected specific video and the first subset of the plurality of size adjusted image frames are displayed together on the same display unit.

2. The method of claim 1, further comprising:
   simultaneously displaying a second subset of a plurality of image frames representing the specific video in the second display area when a size of the second display area is increased without a user's setting input, the second subset of the plurality of image frames comprising the image frames among the beginning and end portions of the specific video, wherein the second subset of the plurality of image frames includes more image frames than the first subset of the plurality of image frames;
   when a second particular image frame among the simultaneously displayed second subset of the plurality of image frames is selected, reproducing the specific video beginning at the selected second particular image frame; and
   determining a number of image frames for the second subset of the plurality of image frames based on a variation amount of motion of a current image frame with respect to a previous image frame, and selecting the current image frame to be included in the second subset of the plurality of image frames when the variation amount of motion of the current image frame exceeds a predetermined threshold.

3. The method of claim 2, wherein the position of the second display area is changed on the display unit, when the size of the second display area is increased without the user's setting input.

4. The method of claim 1, wherein the displaying the first subset of the plurality of image frames comprises maintaining the display of the list of videos in the first display area.

5. The method of claim 2, wherein the displaying the second subset of the plurality of image frames comprises maintaining the display of the list of videos in the first display area.

6. The method of claim 2, wherein the moveable indicator moves along the displayed first and second subsets of the plurality of image frames as the specific video is being reproduced.

7. The method of claim 1, wherein the moveable indicator is displayed in a one-to-one correspondence with the currently selected specific image frame.

8. The method of claim 2, further comprising:
   adjusting a size of each image frame in the second subset of the plurality of image frames based on how well each image frame matches the predetermined threshold,
   wherein displaying the first and second subsets of the plurality of image frames displays the adjusted size of image frames in the second display area.

9. The method of claim 8, wherein adjusting the size of each image frames adjusts a size of an image frame that matches more closely to the predetermined threshold to be larger in size than an image frame that matches less closely to the predetermined threshold.

10. The method of claim 2, wherein displaying the first and second subsets of the plurality of image frames displays the image frames in a sequential reproduction time order in the second display area.

11. The method of claim 2, further comprising:
    changing the predetermined threshold so that all image frames are displayed in the second display area.

12. The method of claim 1, wherein the image frames are received from a source external to the mobile terminal.

13. The method of claim 1, wherein the list of videos correspond to broadcast programs provided by a broadcasting center.

14. The method of claim 1, wherein the list of videos are displayed as a list of key frames where each key frame indicates an individual video.

15. A mobile communication terminal, comprising:
    a display configured to display a list of videos that can be reproduced in a first display area;
    an input unit configured to receive a selection of a specific video from the list of videos, said specific video including all image frames of the specific video; and
    a controller configured to:
      simultaneously display with the list of videos a first subset of a plurality of image frames representing the specific video in a second display area, the first subset of the plurality of image frames comprising the image frames among beginning and end portions of the specific video,
      display a moveable indicator within an area defined by the displayed first subset of the plurality of image frames, the moveable indicator indicating a currently selected specific image frame among the beginning and end portions of the specific video, and
      reproduce the specific video beginning at a first particular image frame when the first particular image frame among the simultaneously displayed first subset of the plurality of image frames is selected, wherein the first and second display areas are predefined on the display, wherein the controller is further configured to determine a number of image frames for the first subset of the plurality of image frames based on a variation amount of motion of a current image frame with respect to a previous image frame, select the image current frame to be included in the first subset of the plurality of image frames when the variation amount of motion of the current image frame exceeds a predetermined threshold, and adjust a size of each image frame in the first subset of the plurality of image frames based on how well the each image frame matches the predetermined threshold, and wherein the selected specific video and the first subset of the plurality of size adjusted image frames are displayed together on the same display.

16. The mobile communication terminal of claim 15, wherein the controller is further configured to:

simultaneously display a second subset of a plurality of image frames representing the specific video in the second display area when a size of the second display area is increased without a user's setting input, the second subset of the plurality of image frames comprising the image frames among the beginning and end portions of the specific video, wherein the second subset of the plurality of image frames includes more image frames than the first subset of the plurality of image frames, and reproduce the specific video beginning at a second particular image frame when the second particular image frame among the simultaneously displayed second subset of the plurality of image frames is selected, and determine a number of image frames for the second subset of the plurality of images based on a variation amount of motion of a current image frame with respect to a previous image frame, and select the current image frame to be included in the second subset of the plurality of images when the variation amount of motion of the current image frame exceeds a predetermined threshold.

17. The mobile communication terminal of claim 16, wherein the position of the second display area is changed on the display, when the size of the second display area is increased without the user's setting input.

18. The mobile communication terminal of claim 15, wherein the controller is further configured to maintain the display of the list of videos in the first display area when displaying the first subset of the plurality of image frames in the second display area.

19. The mobile communication terminal of claim 16, wherein the controller is further configured to maintain the display of the list of videos in the first display area when displaying the second subset of the plurality of image frames in the second display area.

20. The mobile communication terminal of claim 16, wherein the moveable indicator moves along the displayed first and second subsets of the plurality of image frames as the specific video is being reproduced.

21. The mobile communication terminal of claim 15, wherein the moveable indicator is displayed in a one-to-one correspondence with the currently selected specific image frame.

22. The mobile communication terminal of claim 16, wherein the controller is further configured to:

adjust a size of each image frame in the second subset of the plurality of image frames based on how well each image frame matches the predetermined threshold, and display the adjusted size of image frames in the second display area.

23. The mobile communication terminal of claim 22, wherein the controller is further configured to adjust a size of an image frame that matches more closely to the predetermined threshold to be larger in size than an image frame that matches less closely to the predetermined threshold.

24. The mobile communication terminal of claim 16, wherein the controller is further configured to display the image frames in a sequential reproduction time order in the second display area.

25. The mobile communication terminal of claim 16, wherein the controller is further configured to change the predetermined threshold so that all image frames are displayed in the second display area.

26. The mobile communication terminal of claim 15, further comprising:

a wireless communication unit configured to receive the image frames from a source external to the mobile terminal.

27. The mobile communication terminal of claim 15, further comprising:

a broadcasting receiving module configured to receive broadcast programs provided by a broadcasting center, said broadcast programs corresponding to the list of videos.

28. The mobile communication terminal of claim 15, wherein the controller is further configured to display the list of videos as a list of key frames where each key frame indicates an individual video.

* * * * *